United States Patent [19]

Hayashi

[11] Patent Number: 5,488,708
[45] Date of Patent: Jan. 30, 1996

[54] MEMORY MANAGEMENT IN AN IMAGE PROCESSING APPARATUS WITH DETACHABLE MEMORY

[75] Inventor: Masao Hayashi, Yokohama, Japan

[73] Assignee: Canon Kabushiki Kaisha, Tokyo, Japan

[21] Appl. No.: 209,375

[22] Filed: Mar. 14, 1994

Related U.S. Application Data

[63] Continuation of Ser. No. 659,687, Feb. 25, 1991, abandoned.

[30] Foreign Application Priority Data

Mar. 5, 1990 [JP] Japan ................................ 2-051648

[51] Int. Cl.$^6$ ........................................................ G06F 13/00
[52] U.S. Cl. ................................ 395/442; 395/497.04
[58] Field of Search ...................................... 395/115, 116, 395/425

[56] References Cited

U.S. PATENT DOCUMENTS

| | | | |
|---|---|---|---|
| 4,675,808 | 6/1987 | Grinn et al. ............................ | 364/200 |
| 4,731,738 | 3/1988 | Fisher et al. ............................ | 395/425 |
| 4,870,572 | 9/1989 | Hosono et al. ..................... | 364/DIG. 1 |
| 4,888,687 | 12/1989 | Allison et al. ............................ | 395/425 |
| 4,918,586 | 4/1990 | Nimura et al. ............................ | 395/425 |
| 4,933,877 | 6/1990 | Hasebe ....................................... | 364/521 |
| 4,943,910 | 7/1990 | Nakamura .............................. | 364/200 |
| 5,012,408 | 4/1991 | Conroy ....................................... | 364/200 |
| 5,159,681 | 10/1992 | Beck et al. ............................ | 395/116 |
| 5,222,226 | 6/1993 | Yamaguchi et al. ..................... | 395/425 |

Primary Examiner—David L. Robertson
Attorney, Agent, or Firm—Fitzpatrick, Cella, Harper & Scinto

[57] ABSTRACT

An image processing apparatus capable of effectively utilizing the capacity of an expansion memory, connected to the apparatus, without manual allocation of the memory capacity by the operator. The apparatus detects the connection of the external memory and its capacity, and automatically allocates the capacity to plural uses in a predetermined ratio or a predetermined amount.

6 Claims, 4 Drawing Sheets

F I G. I

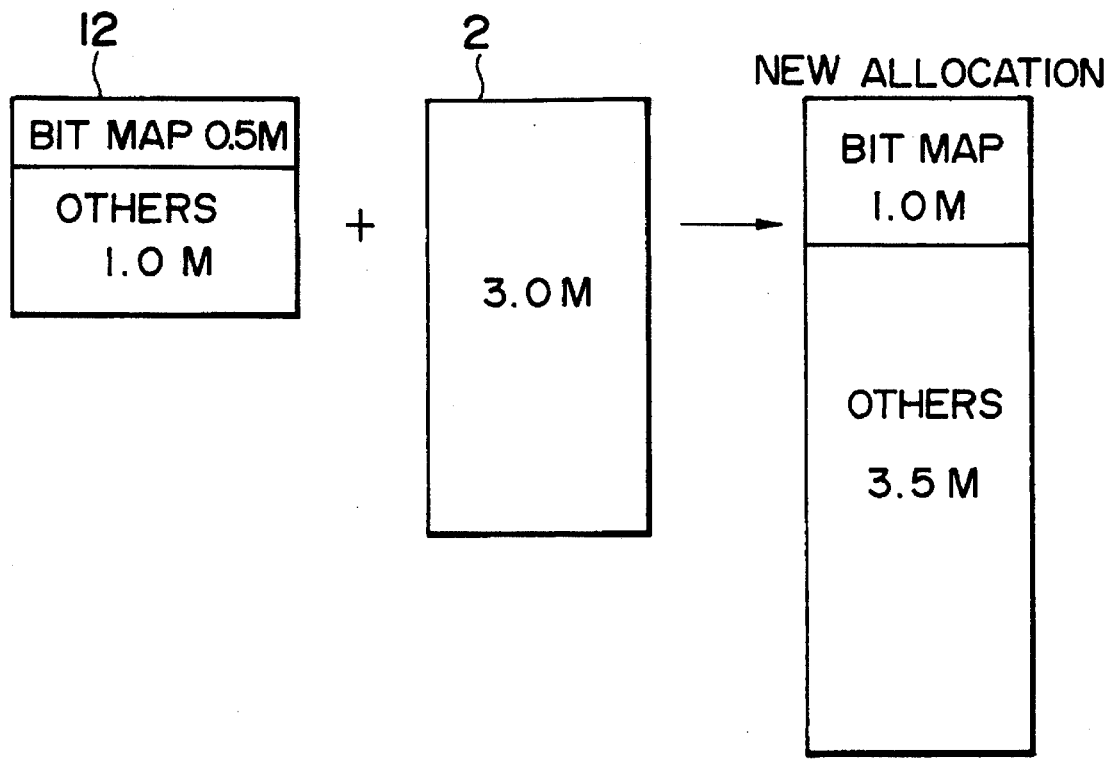
F I G. 4

MEMORY MANAGEMENT IN AN IMAGE PROCESSING APPARATUS WITH DETACHABLE MEMORY

This application is a continuation of application Ser. No. 07/659,687 filed Feb. 25, 1991, now abandoned.

BACKGROUND OF THE INVENTION

1. Field of the Invention

The present invention relates to an image processing apparatus, and more particularly to an apparatus for the output of image information such as a printer.

2. Related Background Art

In a conventional image recording apparatus such as a laser beam printer, when an expansion memory is mounted, the user has to allocate the capacity of the expansion memory for different functions, for example by input operations through an operation panel of the apparatus.

In general, in a page printer such as the laser beam printer, the capacity of the bit map memory has a significant influence on the processing ability of the printer.

However, in the conventional image recording apparatus, the processing ability cannot be securely increased by the connection of an expansion memory unless the user effects certain changes in the setting.

SUMMARY OF THE INVENTION

An object of the present invention is to provide an apparatus capable of varying the allocation of memory capacities to the memories of different functions in response to the connection of an expansion memory.

Another object of the present invention is to provide an apparatus capable, when an expansion memory is connected, of varying the allocation of memory capacities to the memories of different functions, according to the capacity of the expansion memory.

The foregoing objects can be attained, according to an aspect of the present invention, by an information processing apparatus comprising:

internal memory means; allocation means for allocating the memory area of the internal memory means to plural uses; connection means for connecting an external memory; detection means for detecting presence or absence of the external memory connected to the connection means; and control means for varying the allocation by the allocation means, including the area of the external memory, when the connection of the external memory is detected by the detection means.

Also according to another aspect of the present invention, there is provided an information processing apparatus comprising:

internal memory means; allocation means for allocating the memory area of the internal memory means to plural uses; connection means for connecting an external memory; detection means for detecting presence or absence of the external memory connected to the connection means; sensor means for sensing the capacity of the external memory; and control means for varying, when the connection of the external memory is detected by the detection means, the allocation by the allocation means, including the area of the external memory, according to the capacity of the external memory sensed by the sensing means.

Also according to still another aspect of the present invention, there is provided an apparatus comprising:

internal memory means; allocation means for allocating the memory area of the internal memory means to a bit map and other uses; connection means for connecting an external memory; detection means for detecting presence or absence of the external memory connected to the connection means; and control means for varying the allocation by the allocation means, including the area of the external memory when the connection of the external memory is detected by the detection means.

Also according to still another aspect of the present invention, there is provided an apparatus comprising:

internal memory means; allocation means for allocating the memory area of the internal memory means to a bit map and other uses; connection means for connecting an external memory; detection means for detecting presence or absence of the external memory connected to the connection means; sensing means for sensing the capacity of the external memory; and control means for varying, when the connection of the external memory is detected by the detection means, the allocation by the allocation means, including the area of the external memory, according to the capacity sensed by the sensing means.

BRIEF DESCRIPTION OF THE DRAWINGS

FIG. 4 is a view showing the change in memory capacity.

DETAILED DESCRIPTION OF THE PREFERRED EMBODIMENTS

Now the present invention will be clarified in detail by embodiments thereof shown in the attached drawings.

Figure 1:
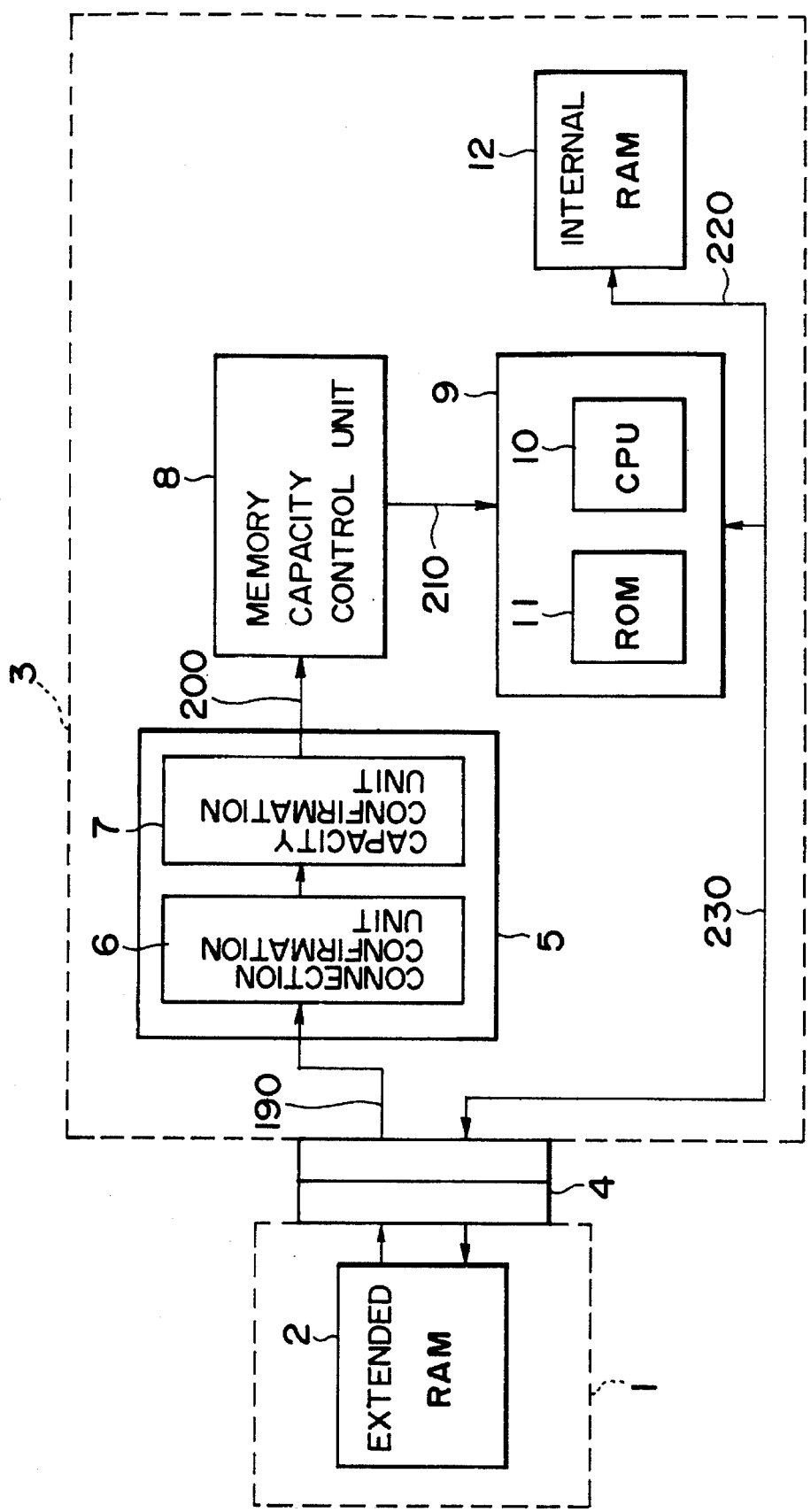
FIG. 1 is a block diagram of a controller of the image processing apparatus constituting an embodiment of the present invention.

FIG. 1 is a block diagram of a controller of the image recording apparatus constituting an embodiment of the present invention, wherein shown are an optional expansion memory unit 1; an extended RAM 2 in the form of a dynamic random access memory (DRAM) loaded in the expansion memory unit 1; and a controller unit 3 of the image recording apparatus, connected by a connector 4 with the extended RAM.

Information 190 from the expansion memory unit 1 is entered through the connector 4 to a detector unit 5. The information 190 is status information concerning the extended RAM 2.

In the detector unit 5, based on the information 190, a connection confirmation unit 6 detects the connection of the expansion memory unit 1, and a memory capacity confirmation unit 7 senses the capacity of the extended RAM 2.

Then a signal 200 transmitted by the connection confirmation unit 6 and the capacity confirmation unit 7 of the detector unit 5 informs a memory capacity control unit 8 of the capacity of the extended RAM 2. The signal 200 is an extended memory status signal from the detector unit 5.

Based on the received information on the capacity of the extended RAM 2, the memory control unit 8 varies the capacities of memory areas and informs a main control unit 9 of the image recording apparatus of memory capacity variation information 210.

The main control unit 9, composed for example of a CPU (central processing unit) 10 and a ROM (read-only memory) 11, receives information from an external information processing apparatus such as a computer, develops the information on a bit map memory (allocated in the internal RAM and the extended RAM as will be explained later in more details), and sends thus developed information to a printing unit of the image recording apparatus. Based on the received information, the printing unit records visible image information on a recording sheet.

Upon receiving the memory capacity variation information, the main control unit 9 thereafter effects development and storage of image information on the internal RAM 12 and the extended RAM 2 according to signals 220 and 230, utilizing a new RAM address map. The signal 220 is a control signal from the main control unit 9 to the internal RAM 12 and bidirectional image information signals therebetween, and the signal 230 is a control signal from the main control unit 9 to the extended RAM 2 and bidirectional image information signal therebetween.

Figure 2:
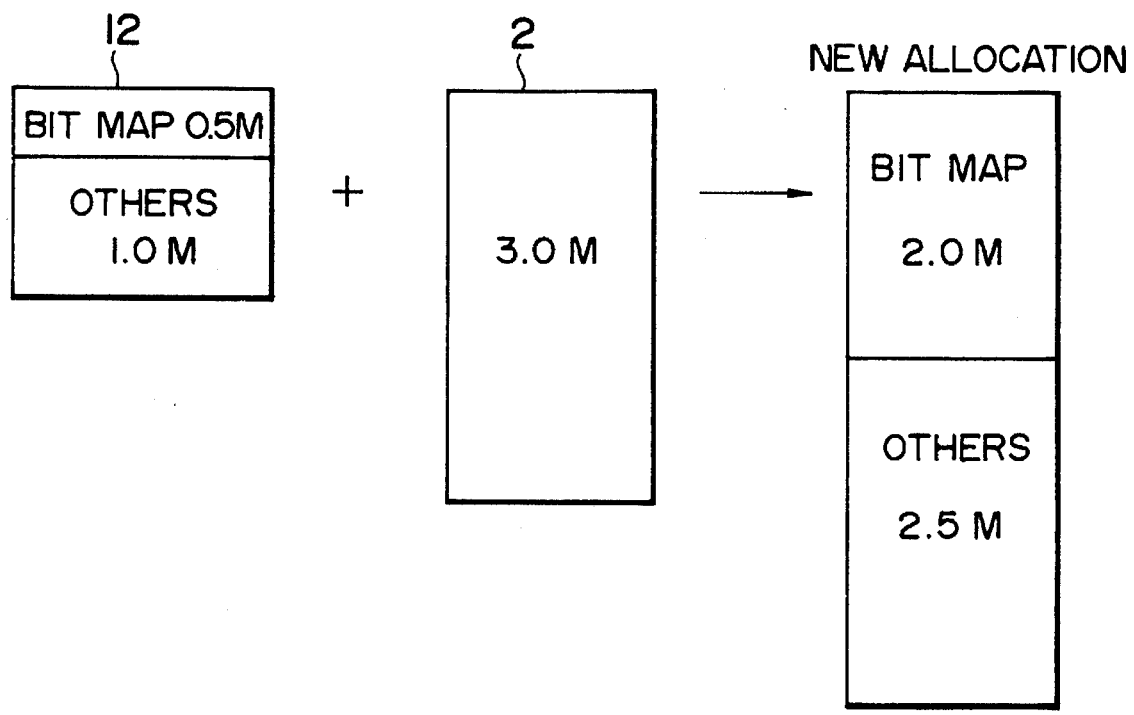
FIG. 2 is a view showing the change in memory capacity.

FIG. 2 illustrates an example of the change in memory capacities.

At first the internal RAM 12 has a bit map memory of 0.5 MB and other areas of 1.0 MB. With the connection of the extended RAM 2 (3.0 MB), a half of the capacity thereof is assigned to the expansion of the bit map memory while the other half is used for the expansion of other areas, so that the bit map memory becomes 2.0 MB while other areas become 2.5 MB.

Figure 3:
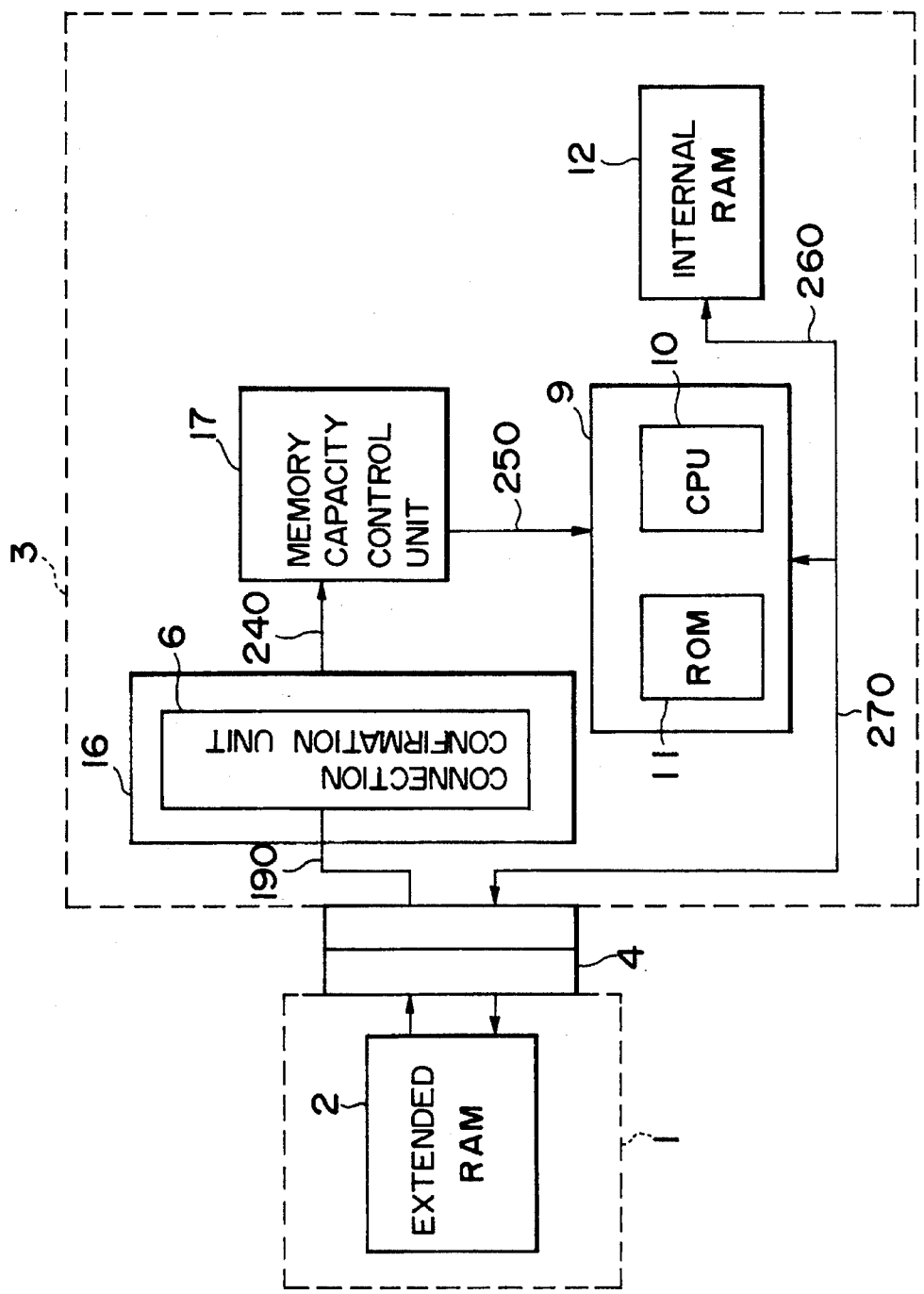
FIG. 3 is a block diagram of a controller of the image processing apparatus constituting another embodiment of the present invention.

FIG. 3 is a block diagram of a part of the controller of the image recording apparatus constituting another embodiment of the present invention, wherein the same components as those in FIG. 1 are represented by same numbers and will not be explained further.

The detector unit 16 of the present embodiment is different from that in the foregoing embodiment, in the absence of the capacity confirmation unit.

When the detector unit 16 identifies the connection of the expansion memory unit 1 to the connector 4, the detector unit 16 supplies the memory capacity control unit 17 with a signal 240, which is an extended memory status signal.

The memory capacity control unit 17 expands the bit map memory capacity to a full page painting capacity (about 1 MB with 300 dpi in letter size), and supplies the main control unit 9 of the image recording apparatus with corresponding information 250, which is memory capacity variation information.

Thereafter the main control unit 9 effects the development of image information with the bit map memory of a full page painting amount, and sends the thus developed image information in the form of signals 260 and 270 respectively to the internal RAM 12 and the extended RAM 2. The signal 260 also serves as the control signal from the main control unit 9 to the internal RAM 12, and the signal 270 also serves as a control signal from the main control unit 9 to the extended RAM 12.

FIG. 4 illustrates an example of the change in memory capacities.

As in the foregoing embodiment, the internal RAM 12 is assumed to have a bit map memory of 0.5 MB and other areas of 1.0 MB, and an extended RAM 2 of 3.0 MB is assumed to be connected.

In the present embodiment, a part of the 3.0 MB is used for the expansion of the bit map memory until it reaches 1.0 MB, and the remaining part is used for expansion of other areas, so that the bit map memory has a capacity of 1.0 MB while other areas have a capacity of 3.5 MB.

In the present embodiment, the increase in the capacity of the bit map memory is fixed regardless of the capacity of the expansion memory. Consequently the detector unit lacks a part for sensing the capacity of the expansion memory, and is therefore made simpler in structure than in the foregoing embodiment.

As explained in the foregoing, the present invention, capable of varying the allocation of memory areas by detecting the connection of an expansion memory, allows to securely and effectively utilize the connected expansion memory.

I claim:

1. An information processing apparatus which performs a plurality of processings, comprising:

internal memory means;

first definition means for defining areas available for each of the plurality of processings, respectively, in said internal memory means;

connection means for detachably connecting an expansion memory to said apparatus;

detection means for detecting presence or absence of the expansion memory to be connected to said apparatus;

second definition means for defining, in the expansion memory, a fixed size area available for a predetermined one of the plurality of processings and additional areas available for each of the plurality of processing other than the predetermined one, respectively, in response to the detection of the presence of the expansion memory by said detection means; and processing means for performing each of the plurality of processings of information by utilizing the areas available for respective processings defined by said first definition means in the internal memory means, and by further utilizing the areas in the expansion memory available for the respective processing defined by said second definition means if the expansion memory is connected to said apparatus.

2. An information processing apparatus which performs a plurality of processings, comprising:

internal memory means;

first definition means for defining areas available for each of the plurality of processings, respectively, in said internal memory means;

connection means for detachably connecting an expansion memory to said apparatus;

detection means for detecting presence or absence of the expansion memory to be connected to said apparatus;

second definition means for defining, in response to sensing of the capacity of the expansion memory by said sensing means, areas in the expansion memory available for each of the plurality of processing, respectively, with sizes corresponding to predetermined ratios of the capacity of the expansion memory sensed by said sensing means; and processing means for performing each of the plurality of processings of information by utilizing the areas available for respective processings defined by said first definition means in the internal memory means, and by further utilizing the areas in the expansion memory available for the respective processing defined by said second definition means if the expansion memory is connected to said apparatus.

3. An image processing apparatus which performs a plurality of processings including bit map extension, comprising:

internal memory means;

first definition means for defining areas available for each of the plurality of processings including bit map extension, respectively, in said internal memory means;

connection means for detachably connecting an expansion memory to said apparatus;

detection means for detecting presence or absence of the expansion memory to be connected to said apparatus;

second definition means for defining, in the expansion memory, a fixed size area available for bit map extension and the rest of areas available for other processings, respectively, in response to the detection of the presence of the expansion memory by said detection means; and processing means for performing each of the plurality of processings of information by utilizing the areas available for respective processings defined by said first definition means in the internal memory means, and by further utilizing the areas in the expansion memory available for the respective processings defined by said second definition means, if the expansion memory is connected to said apparatus.

4. An image processing apparatus according to claim 3, wherein said second definition means defines the fixed size area such that the sizes of the areas available for the bit map extension sum up to one page of image data.

5. An information processing apparatus which performs a plurality of processings including bit map extension, comprising:

internal memory means;

first definition means for defining areas available for each of the plurality of processings including bit map extension, respectively, in said internal memory means;

connection means for detachably connecting an expansion memory to said apparatus;

detection means for detecting presence or absence of the expansion memory to be connected to said apparatus;

sensing means for sensing a capacity of the expansion memory in response to the detection of the presence of the expansion memory by said detection means;

second definition means for defining, in response to sensing of the capacity of the expansion memory by said sensing means, in the external memory, an area with half size of the capacity sensed by said sensing means available for bit map extension and the rest of areas available for other processings, respectively; and processing means for performing each of the plurality of processings of information by utilizing the areas available for respective processings defined by said first definition means in the internal memory means, and by further utilizing the areas in the expansion memory available for the respective processings, defined by said second definition means, if the expansion memory is connected to said apparatus.

6. An image processing apparatus according to claim 3 or 5, further comprising:

input means for entering image data as an object for the bit map extension by said processing means; and output means for outputting the image data extended on the bit mad by said processing means.

\* \* \* \* \*

UNITED STATES PATENT AND TRADEMARK OFFICE
CERTIFICATE OF CORRECTION

PATENT NO. : 5,488,708

DATED : January 30, 1996

INVENTOR : MASAO HAYASHI

It is certified that errors appears in the above-identified patent and that said Letters Patent is hereby corrected as shown below:

ON TITLE PAGE

In [56] U.S. PATENT DOCUMENTS: "Nimura et al." should read Niimura et al.--.

COLUMN 3

Line 45, "painting" should read --printing--.
Line 52, "painting" should read --printing--.

COLUMN 4

Line 6, "Consequently" should read --Consequently,--.
Line 29, "processing" should read --processings--.
Line 39, "processing" should read --processings--.
Line 56, "processing," should read --processings,--.
Line 65, "processing" should read --processings--.

UNITED STATES PATENT AND TRADEMARK OFFICE
CERTIFICATE OF CORRECTION

PATENT NO. : 5,488,708

DATED : January 30, 1996

INVENTOR : MASAO HAYASHI

It is certified that errors appears in the above-identified patent and that said Letters Patent is hereby corrected as shown below:

COLUMN 6

Line 32, "mad" should read --map--.

Signed and Sealed this

Twenty-fifth Day of June, 1996

Attest:

BRUCE LEHMAN

Attesting Officer

Commissioner of Patents and Trademarks